J. F. LOGAN.
HOSE-LEAK STOPPERS.
No. 194,697.  Patented Aug. 28, 1877.
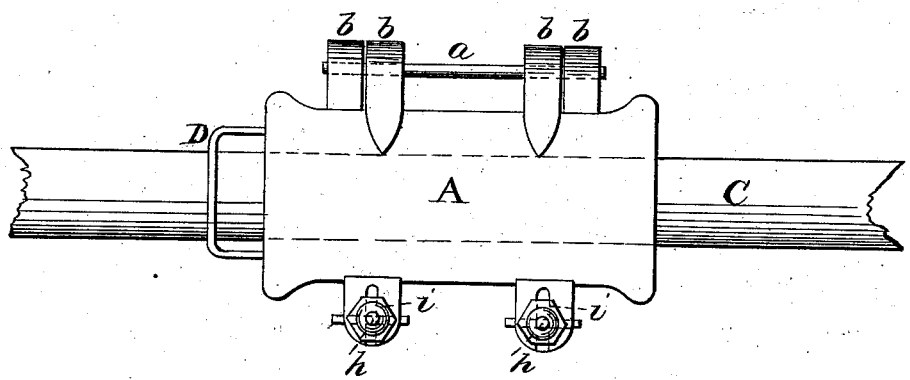
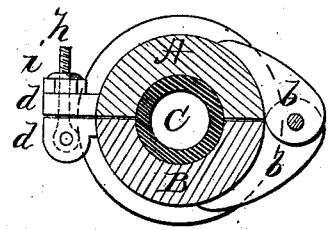
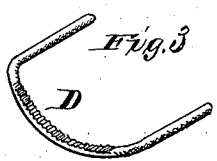

UNITED STATES PATENT OFFICE.

JOHN F. LOGAN, OF INDIANAPOLIS, INDIANA.

IMPROVEMENT IN HOSE-LEAK STOPPERS.

Specification forming part of Letters Patent No. 194,697, dated August 28, 1877; application filed August 2, 1877.

*To all whom it may concern:*

Be it known that I, JOHN F. LOGAN, of Indianapolis, in the county of Marion, and in the State of Indiana, have invented certain new and useful Improvements in Hose-Leak Stoppers; and do hereby declare that the following is a full, clear, and exact description thereof, reference being had to the accompanying drawings, and to the letters of reference marked thereon, making a part of this specification.

The nature of my invention consists in the construction and arrangement of a clamp for stopping leaks in hose in time of fire, as will be hereinafter more fully set forth.

In order to enable others skilled in the art to which my invention appertains to make and use the same, I will now proceed to describe its construction and operation, referring to the annexed drawings, in which—

Figure 1 is a side view of my invention. Fig. 2 is a central cross-section of the same. Fig. 3 is a view of the toothed spring.

The clamp is made in two semi-tubular parts, A and B, having beads around the ends, as shown. These two parts are hinged together by means of a rod, $a$, passed through ears or projections $b\ b$, cast on them at one side, as shown. On the other side, at the edges of the two parts, are forked ears or projections $d\ d$, cast on and projecting from them. In these forked ears on one part are hinged eyebolts $h\ h$, which, when the clamp is closed, are turned into the corresponding ears on the other part, and nuts $i$ on said bolts then run down to fasten the parts.

This clamp is intended to be made of various lengths, to cover any leak in a hose. It fits the hose closely, and when the parts of the clamp or shell are bolted together, as described, the edges of the break are forced into contact again.

A packing of rubber or other suitable material may be placed within the shell or clamp covering the leak. The pressure within the hose C expands it, and holds it close against this packing, thus making a strong and perfect joint. This packing may be dispensed with, and yet make a perfect joint.

By means of the bolts and nuts the clamp can be easily adjusted, effecting a great saving of time; and the clamp can be applied at any point of the hose in case of fire, so as not to have to take out a section, thus saving time and money. The bolts $h$ are placed one near each end of the clamp, making it perfectly strong, and yet admitting of its being made light.

At one or boths ends of the clamp, to each part, is fastened a U-shaped spring, D, on the inner side of which are struck-up points or teeth. These points penetrate the material of the hose to a slight depth, for the purpose of preventing any change in the position of the shell due to dragging on the ground, or to the pressure being taken off while the hose is raised to a building.

Having thus fully described my invention, what I claim as new, and desire to secure by Letters Patent, is—

1. The combination of the two semicircular parts A B, having ears $b\ b$, and connected by the rod $a$, the forked ears $d\ d$, the hinged eye-bolts $h\ h$, and nuts $i\ i$, all constructed substantially as set forth.

2. One or more U-shaped springs D, having teeth or points on the inner side, in combination with the two-part hose-leak stopper, substantially as set forth.

3. In combination with a longitudinally-bisected clamp for stopping leaks in hose, one or more springs attached to the clamp, and pressing against the hose, substantially as and for the purposes herein set forth.

In testimony that I claim the foregoing I have hereunto set my hand this 11th day of July, 1877.

JOHN F. LOGAN.

Witnesses:
 M. H. CAIN,
 M. J. LOGAN.